(12) United States Patent
Gregg et al.

(10) Patent No.: US 7,231,574 B2
(45) Date of Patent: Jun. 12, 2007

(54) HARDWARE MECHANISM FOR RECEIVING FRAMES FROM A LINK

(75) Inventors: Thomas A. Gregg, Highland, NY (US); Kulwant M. Pandey, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 944 days.

(21) Appl. No.: 09/961,012

(22) Filed: Sep. 21, 2001

(65) Prior Publication Data

US 2003/0061375 A1    Mar. 27, 2003

(51) Int. Cl.
  *G06F 11/00*  (2006.01)
  *H04L 1/08*  (2006.01)

(52) U.S. Cl. .................. 714/746; 714/749; 714/47

(58) Field of Classification Search ............... 714/776, 714/748, 18, 47, 746, 724, 749, 750, 751, 714/752, 758, 48; 370/230, 235, 242, 342
See application file for complete search history.

(56) References Cited

U.S. PATENT DOCUMENTS

| | | | | |
|---|---|---|---|---|
| 4,947,484 A | * | 8/1990 | Twitty et al. | 714/776 |
| 5,422,893 A | * | 6/1995 | Gregg et al. | 714/748 |
| 5,490,153 A | * | 2/1996 | Gregg et al. | 714/748 |
| 5,574,945 A | * | 11/1996 | Elko et al. | 710/5 |
| 5,968,179 A | * | 10/1999 | Barkey et al. | 713/400 |
| 2002/0038336 A1 | * | 3/2002 | Abileah et al. | 709/203 |

* cited by examiner

*Primary Examiner*—Phung My Chung
(74) *Attorney, Agent, or Firm*—Lynn L. Augspurger (57) ABSTRACT

A method and system for extensions to earlier patents dealing with the implementation of the InterSystem Channel (ISC) link architecture. First, it describes hardware state machines that handle all valid link messaging sequences without any processor involvement. These state machines also process larger commands and responses that may be divided into multiple frame segments. Finally, the missing frame detection is expanded for the multi frame segment commands and responses.

14 Claims, 8 Drawing Sheets

| STATE → <br> EVENT ↓ | IDLE | BUSY | ACTIVE | LOCKED | ERROR |
|---|---|---|---|---|---|
| LCW DET Start=1 | BUSY | - | STOPPED  1 | STOPPED  2 | BUSY |
| LCW DET Start=0 | ERROR  3 | - | BUSY | STOPPED  2 | ERROR |
| INFO DET | - | BUSY/ERROR  4 | - | - | ERROR |
| EOF DET | - | LOCKED/ACTIVE/ERROR  5 | - | - | ERROR |
| CV/CRC | - | ERROR | - | - | ERROR |
| UNLOCK COMMAND | IDLE | IDLE | IDLE | IDLE | IDLE |
| LOCK COMMAND | LOCKED | LOCKED | LOCKED | LOCKED | LOCKED |

Figure 7

| STATES | | DATA | | | RECEIVED LCWs | | |
|---|---|---|---|---|---|---|---|
| DATA | MRB | S, A | S, $\bar{A}$ | $\bar{S}$ | S, A | S, $\bar{A}$ | $\bar{S}$ |
| IDLE | IDLE | OK | OK | DD | OK,DD | OK | DM |
| ACTIVE | IDLE | P | P | OK | OK,DD | P | DD,DM |
| LOCKED | IDLE | L | L | L | OK | P | DM |
| ERROR | IDLE | OK | OK | - | OK | P | DM |
| IDLE | ACTIVE | P | P | P | P | P | OK |
| ACTIVE | ACTIVE | P * | P * | P * | P * | P * | P * |
| LOCKED | ACTIVE | L | L | L | P | P | OK |
| ERROR | ACTIVE | P | DM,OK | DM,DD | P | P | OK |
| IDLE | LOCKED | P | P | P | L | L | L |
| ACTIVE | LOCKED | P | P | OK | L * | L * | L * |
| LOCKED | LOCKED | L | L | L | L | L | L |
| ERROR | LOCKED | P | OK | - | L | L | L |
| IDLE | ERROR | P | P | P | OK,DD | OK | - |
| ACTIVE | ERROR | * | * | * | * | * | * |
| LOCKED | ERROR | L | L | L | OK | P * | - |
| ERROR | ERROR | P | OK | - | OK | P * | - |

Figure 8

| STATES | | RECEIVED LCWs | | | | | |
| --- | --- | --- | --- | --- | --- | --- | --- |
| | | MCB | | | DATA | | |
| MCB | DATA | S, A | S, $\bar{A}$ | $\bar{S}$ | S, A | S, $\bar{A}$ | $\bar{S}$ |
| IDLE | IDLE | OK | OK | DM | DM | DM | DD,DM |
| ACTIVE | IDLE | P | P | OK | DM | DM | DD,DM |
| LOCKED | IDLE | L | L | L | OK | OK | DD |
| ERROR | IDLE | OK | OK | - | OK | OK | DD |
| IDLE | ACTIVE | P * | P * | P * | P * | P * | P * |
| ACTIVE | ACTIVE | P * | P * | P * | P * | P * | P * |
| LOCKED | ACTIVE | L | L | L | P | P | OK |
| ERROR | ACTIVE | DD,OK | P | DD,DM | P | P | OK |
| IDLE | LOCKED | P * | P * | P * | L * | L * | L * |
| ACTIVE | LOCKED | P | P | OK | L | L | L |
| LOCKED | LOCKED | L | L | L | L | L | L |
| ERROR | LOCKED | OK | P | - | L | L | L |
| IDLE | ERROR | P * | P * | P * | P * | P * | P * |
| ACTIVE | ERROR | P | P | OK | DM | DM | DD,DM |
| LOCKED | ERROR | L | L | L | OK | OK | - |
| ERROR | ERROR | OK | P | - | OK | OK | - |

Figure 9

| STATES MRB | RECEIVED LCWs MRB | | |
|---|---|---|---|
| | S, A | S, Ā | S̄ |
| IDLE | P | OK | DM |
| ACTIVE | P | P | OK |
| LOCKED | L | L | L |
| ERROR | P | OK | - |

← 902

| STATES MCB | RECEIVED LCWs MCB | | |
|---|---|---|---|
| | S, A | S, Ā | S̄ |
| IDLE | P | OK | DM |
| ACTIVE | P | P | OK |
| LOCKED | L | L | L |
| ERROR | P | OK | - |

← 904

HARDWARE MECHANISM FOR RECEIVING FRAMES FROM A LINK

FIELD OF THE INVENTION

The present invention relates generally to communications between computer systems and, more particularly, to supporting a method for sending messages between computer systems by automatically in hardware state machines of the commuicating computer systems keeping track of frame reception in a message passing channel when messages are transmitted in multiple frames over a link.

DESCRIPTION OF RELATED ART

Earlier patents dealing with the implementation of the InterSystem Channel (ISC) link architecture include my U.S. Pat. No. 5,574,945 issued Nov. 12, 1996 Multi channel inter-processor coupling facility processing received commands stored in memory absent status error of channels. As communications link speeds increase, it has become more difficult to use microprocessors to handle the reception of link data frames. Therefore, in the new IBM mainframes these functions are being moved into hardware state machines that can more quickly process the frames. In the InterSystem Channel (ISC) used in the newest IBM mainframes, the processing of all valid message frame sequences is moved to hardware state machines. In a previous ISC designs after the processing of all valid message frame sequences was being moved to hardware state machines, the hardware state machine could only process single data message area frames with single frame commands and responses and the prior developments had no way to keep track of frame reception in a message passing channel when messages are transmitted in multiple frames over a link.

SUMMARY OF THE INVENTION

In accordance with the preferred embodiment using only hardware state machiens and not a microprocessor, the sending messages between computer systems, is expedited by automatically in the hardware state machines located in each communicating computer system keeping track of frame reception for different kinds of message sequences in a message passing channel from an originator to a recipient computer system when messages are transmitted in multiple frames over a link. One or more frames for an originator contains a command for the recipient, one or more frames have data or no data; and a linked message process includes the exchange of an intermediate Link Acknowledge (BACK) acknowledgment frame; and the recipient responds with a response back to a originator with one or more frames from the recipient to the originator, including a response, and one or more frames with data or no data contained in the response.

For a no data case the originator sends a Message Command Block (MCB) to the recipient, and the recipient responds with a Message Response Block (MRB) sent back to the originator.

Further improvements in the method and hardware state machines provide for multiple data message area frames. The new hardware state machine handles all valid link messaging sequences without any processor involvement. This state machine also processes larger commands and responses that may be divided into multiple frame segments. Also, it will be recognized that the missing frame detection of IBM's prior attempt to move to a new hardware state machine which handles all valid link messaging sequences without any processor involvement is in our preferred embodiment expanded for the multi frame segment commands and responses. The method employed provides for Link acknowledgments (ACKs) that are generated and recognized by the hardware state machine and not by a microprocessor. This ISC design further extends the ISC architecture by providing large data message areas to avoid link acknowledgments, and by providing larger commands and responses that may be divided into smaller frame segments. To completely define the operation of the hardware state machines, detailed state tables describe the actions during both valid and error sequences of frames.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 (2a, 2b, 2c) illustrate the sequences of message exchanges over the link between two systems;

DETAILED DESCRIPTION OF THE PREFERRED EMBODIMENT

Figure 1:
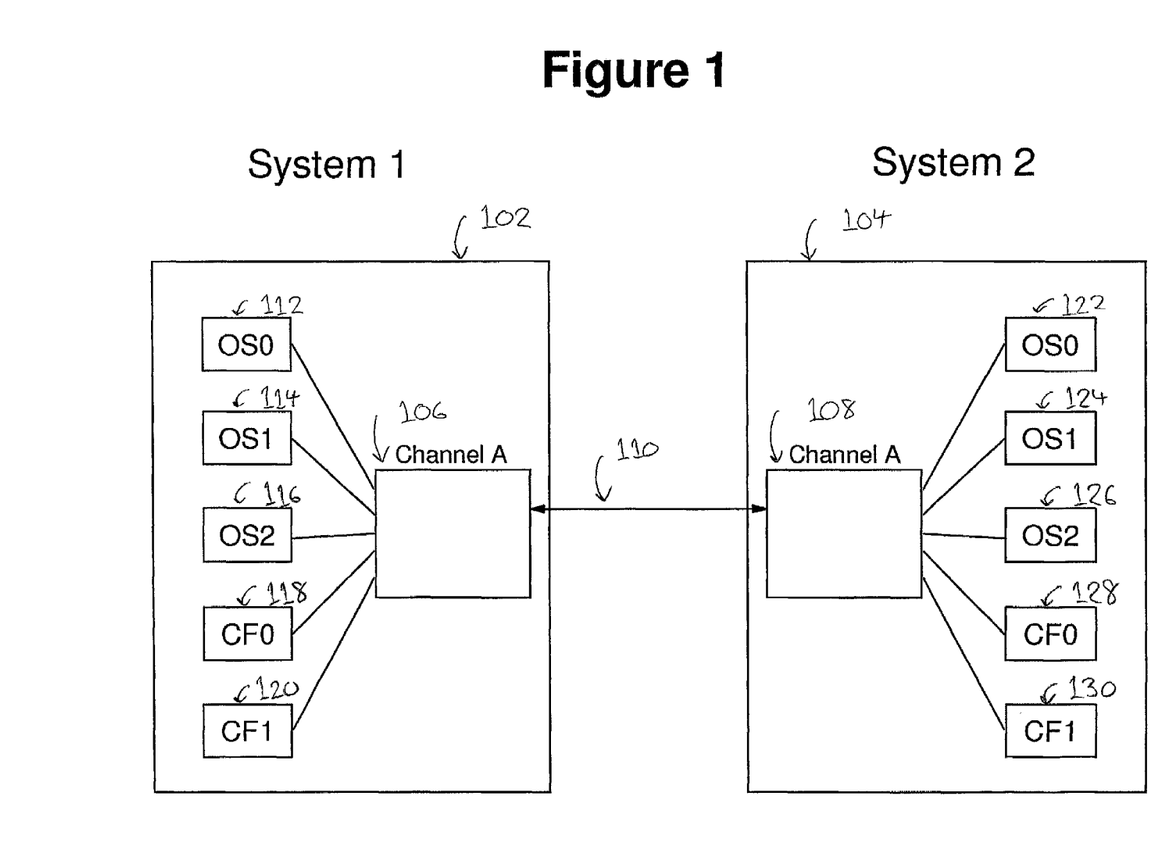
FIG. 1 illustrates two systems connected by an InterSyetem Channel (ISC)

FIG. 1 shows System 1 102 containing Channel A 106 and System 2 104 containing Channel A 108. Hardware State Machines (HSM) are provided for each of Channel A 106 and Channel A 108, as further detailed in FIGS. 6, 7, 8, and 9. The channels are connected by link 110. Messages are sent between Operating System (OS0) 112, OS1 114, OS2 116, Coupling Facility (CF0) 118, CF1 120 in System 1 102 and OS0 122, OS1 124, OS2 126, CF0 128, CF1 130 in System 2 104.

Figure 2A:
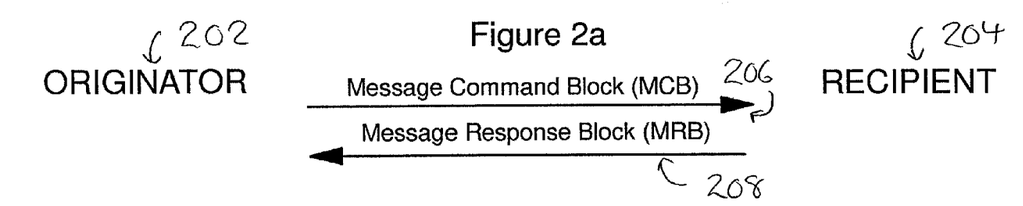

FIG. 2 shows the sequences of three different kinds of messages. FIG. 2a is the 'no data' case where the originator 202 sends a Message Command Block (MCB) 206 to the recipient 204. The recipient 204 responds with a Message Response Block (MRB) 208 sent back to the originator 202.

Figure 2B:
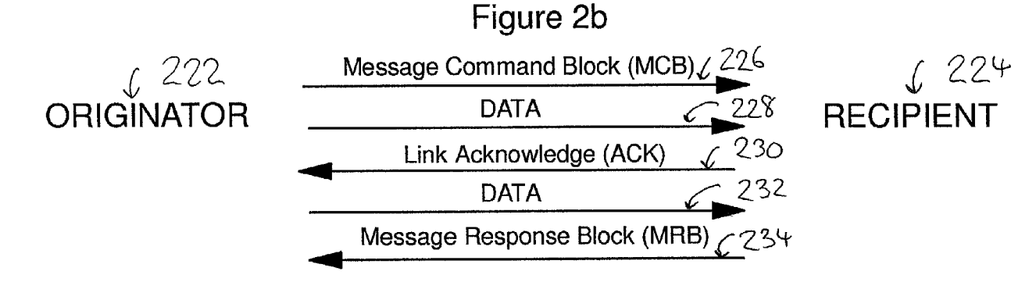

FIG. 2b is the write case where the originator 222 sends DATA to the recipient 224. Following the MCB 226, the originator 222 sends the first Data message area 228 to the recipient 224. If data area message buffer space is limited at the recipient, not all of the message data can be sent in one data area. Flow control is realized through the Link Acknowledge (ACK) 230 sent by the recipient back to the originator 222 when buffer space becomes available. The originator 222 responds by sending the next data area 232 to the recipient. It should be understood that this acknowledgment process can be repeated many times depending on the number of data areas transferred. After the last Data area 232 is received, the recipient 224 sends the MRB 234 back to the originator 222.

Figure 2C:
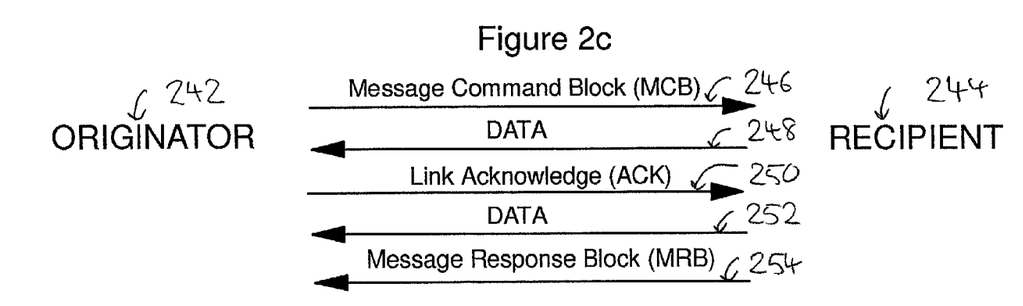

FIG. 2c is the read case where the originator 242 receives DATA from the recipient 244. Following the MCB 246, the recipient 244 sends the first Data area 248 back to the originator 242. If data area buffer space is limited at the originator, not all of the message data can be sent in one data area. Flow control is realized through the Link Acknowledge (ACK) 250 sent by the originator back to the recipient 244 when buffer space becomes available. The recipient 244 responds by sending the next data area 252 to the originator. It should be understood that this acknowledgment process can be repeated many times depending on the number of data areas transferred. After the last Data area 252 is sent, the recipient 244 sends the MRB 254 back to the originator 242.

Figure 3:
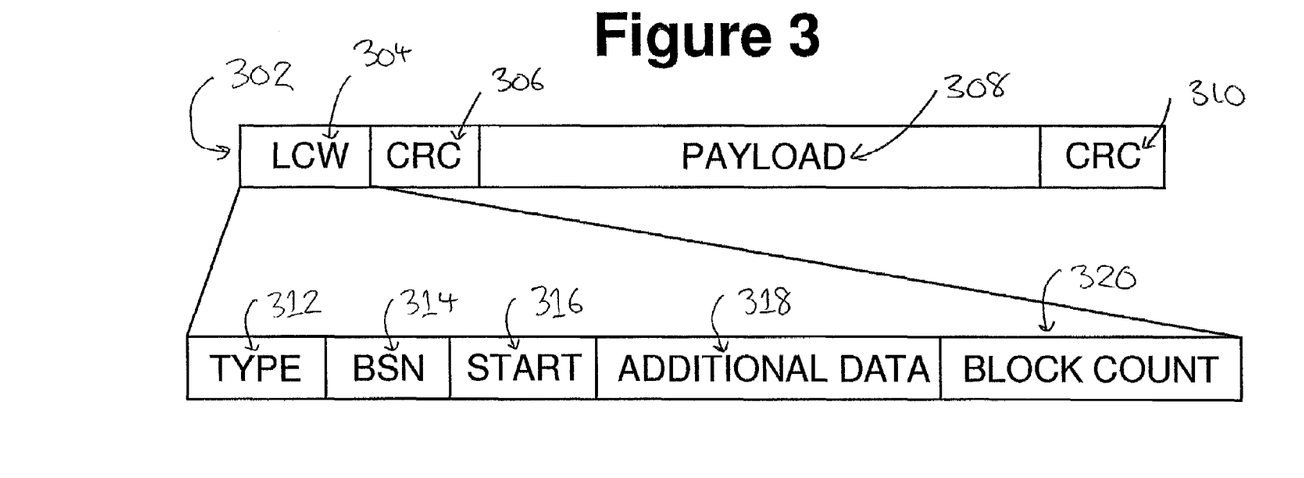
FIG. 3 illustrates the structure of the message frames.

FIG. 3 shows the format of the frames used to exchange MCBs, Data, MRBs, and ACKs over the link. Each frame 302 starts with a Link Control Word (LCW) 304 followed by a Cyclic Redundancy Code (CRC) 306 protecting the LCW. Next is the payload 308 which consists of anywhere from zero to 4096 bytes; ACKs have no payload. If there is a payload 308, it is protected by a second Cyclic Redundancy Code (CRC) 310. The LCW 304 is shown in more detail. It comprises a type field 312 that specifies the frame as an MCB, Data, MRB, ACK, or other frame. The buffer set number (BSN) field 314 identifies the particular message facilities used to exchange this particular message. It should be understood that multiple messages may be multiplexed together over a single link. The BSN field keeps track of which message the frame belongs to. The start bit 316 indicates that this is the first frame of a message area. The additional data bit 318 (A bit) indicates several different things. In an MCB it indicates that there is a least one Data area to follow (the write case), in an MRB it indicates that there was at least one Data area preceding the MRB (the read case), and in a Data frame it indicates that there is another Data area to follow and that an ACK is required to proceed to the next Data area. The A bit is only valid when the start bit is set to one. The block count 320 specifies the number of 256 byte blocks in the message area. It does not specify the length of the current frame, but specifies the total number of all of the frames for this message area. The block count 320 is only valid when the start bit is set to one.

Figure 4:
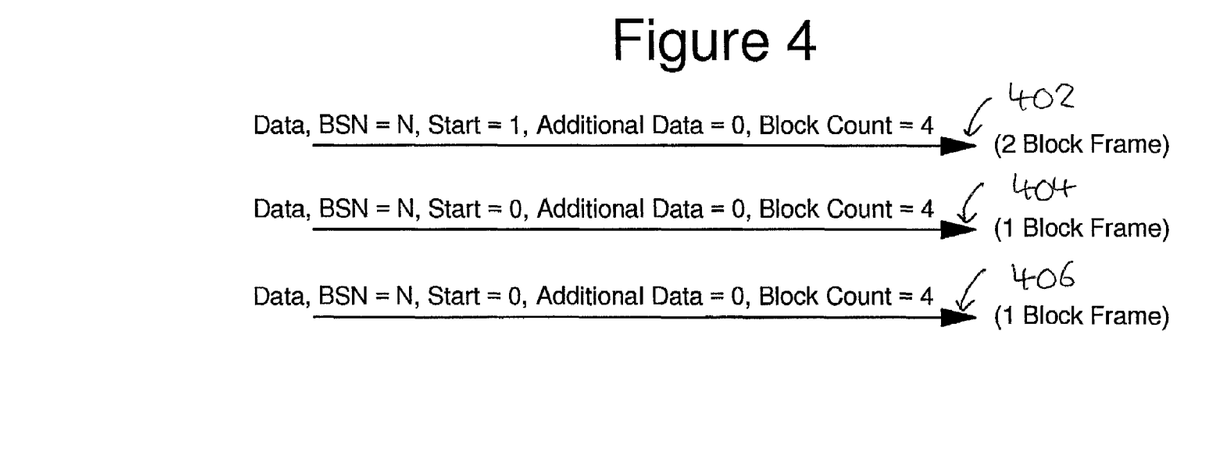
FIG. 4 illustrates how a message area can be segmented into more than one frame.

FIG. 4 shows how a message area can be segmented into multiple frames. Message areas can be divided into any number of frames, but each frame must be an even multiple of 256 byte blocks. In this example, a Data area of 1024 bytes is divided into three frames. The first frame 402 of the Data area has the start bit set to one, and the block count is 4. This frame is two blocks long (512 bytes), so the receiver knows that two more blocks are coming. The second frame 404 has the start bit set to zero, so the receiver knows that this is a continuation of a previous message area. This frame is one block long (256 bytes). The third frame 406 also has the start bit set to zero, and it is one block long. The receiver knows that this frame will complete the block count specified in the first frame 402.

Figure 5:
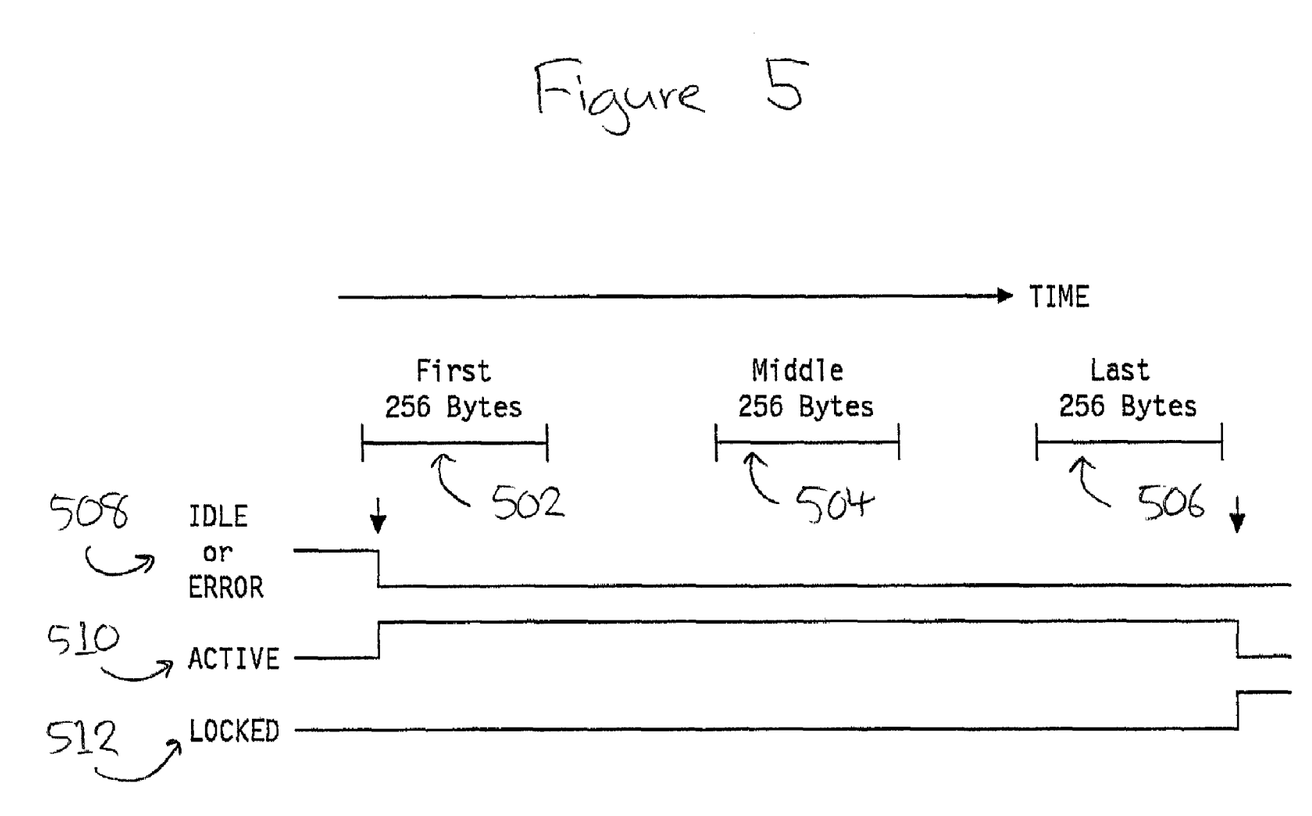
FIG. 5 illustrates the states of the message area as a segmented frame is received.

FIG. 5 shows the key states of the message area shown in FIG. 4 as its frame(s) are being received. This figure assumes that the message area is transmitted by three frames and that there are no errors. Each message area has four basic states: IDLE, ACTIVE, LOCKED, and ERROR. However, several more are used in the actual implementation. A fifth state, BUSY, is temporary and defined under the ACTIVE state. It exists only while the payload of a frame is being received. In addition, each buffer set (comprising of a message area for the MCB or MRB and a message area for the Data) has an overall LOCKED state and a STOPPED state. When the first frame 502 is received, the message area transitions from the IDLE or ERROR 508 state to the ACTIVE 510 state. The reception of the second frame 504 does not change any of the major states, and the receiver is waiting for the rest of the payload. At the end of the third frame 506, the message area's block count is satisfied, and the area transitions from the ACTIVE 510 state to the LOCKED 512 state.

Figure 6:
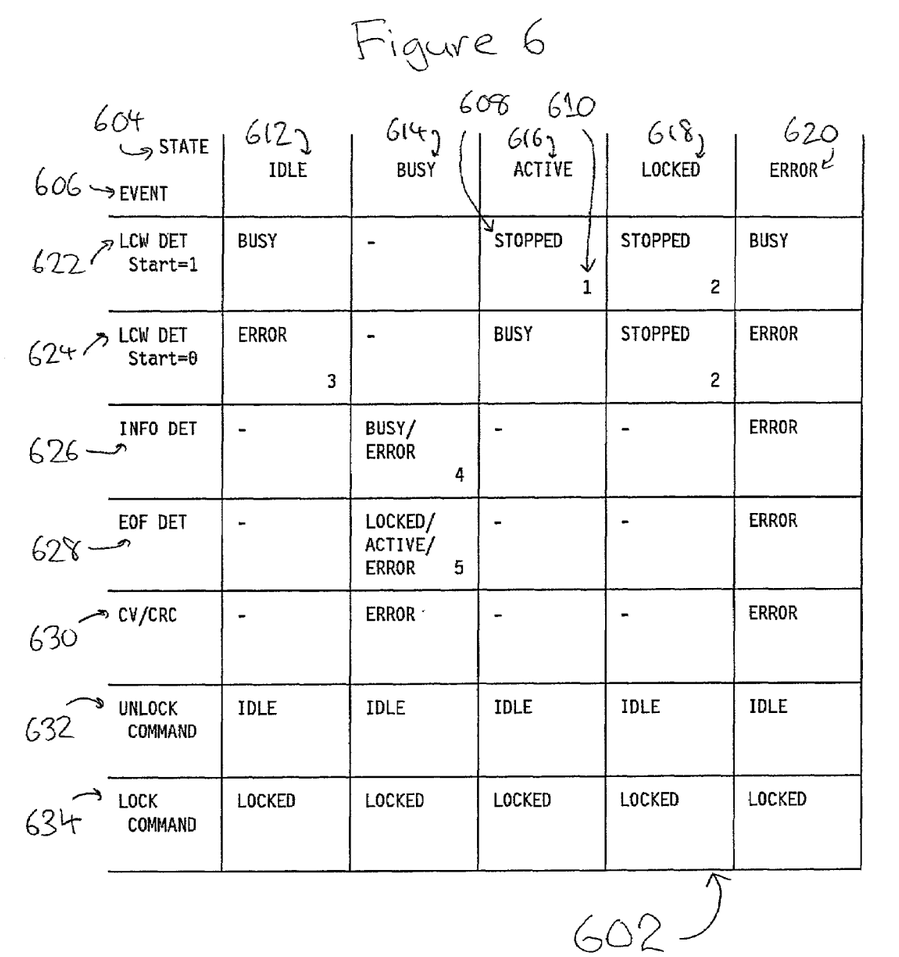
FIG. 6 illustrates the state table describing the actions of a single message area.

FIG. 6 further defines the operation of the message areas. Along the top of the table 602 are the message area states 604, and along the left side of the table are events 606, such as the reception of an LCW. Each box in the table has two areas. On the top line (such as 608) is the next state. For example, if the message area is in the IDLE state and an LCW is received with the start bit off, the message area goes to the ERROR state. In some boxes there is no next state (indicated by '-') because the hardware cannot present these sequences of events to the message areas. In some boxes there are 2 or 3 next states (separated by '/'). A few of the boxes have numbers at the bottom, such as 610, and these refer to the notes enumerated below.

The message area states are:

1) IDLE 612. The message area is waiting to receive the first frame. The start bit must be set to 1. If the start bit is 0, it is assumed that a previous frame with the start bit on had a damaged LCW and was lost. Note that frames with an error in LCW (and its CRC field) are considered to be 'lost' since the LCW has no reliable information. On the other hand, frames with errors in the payload or its CRC have valid LCW information that can be used to recover the frame (by retransmission). In this case when the start bit is set to zero, the Damaged MCB/MRB or Data (DM or DD) bit is set and the message area is put into the error state. For originator buffer sets, sending the MCB sets the MRB and Data area states to IDLE, and for recipient buffer sets, sending the MRB sets the MCB and Data area states to IDLE. When an LCW is received with the start bit on, the data from the payload is loaded into the message area starting at address 0. Also the block count is captured and checked to see if it is in the correct range for the message area type and mode.

2) BUSY 614. A frame payload is being received. In this state, only payload bytes or an end of frame (EOF) delimiter can be received. Frame length checking is performed in this state.

3) ACTIVE 616. The first frame for the message area has been successfully received, but the block count has not yet been satisfied. This state exists for not only data areas as in the previous art, but also for MCBs and MRBs with payloads greater than 256 bytes. When an LCW is received with the start bit off, the message area remains in the BUSY state. If an LCW is received with the start bit on, the entire buffer set goes to the STOPPED state with a protocol error.

4) LOCKED 618. All of the frames for the message area have been received successfully, and the block count has been satisfied. This state also inhibits any more data from being written into the message area. If an LCW is received, the entire buffer set goes to the STOPPED state and the Lock Error indicator is set.

5) ERROR 620. An error that is most likely caused by bit errors on the link has been detected for the message area. These errors are code violations or CRC errors in the payload, frame length errors, and suspected missing frames (LCWs damaged). In this state, all frames for the message area are discarded until a frame is received with the start bit in the LCW set to 1.

6) STOPPED. This state is not shown in table 602, and it applies to the entire buffer set (both the MCB or MRB message area and the Data message area). It indicates that a lock or protocol error that could not be caused by bit errors on the link was detected.

The message area events are:

1) LCW DET, Start=1 622. An LCW with the start bit on was detected. If the message area is in the IDLE or ERROR state, it goes to the BUSY state waiting to receive payload bytes. If the message area is in the ACTIVE state, a Protocol Error is detected and the entire buffer set goes to the STOPPED state. If the message area is in the LOCKED state, a Lock Error is detected and the entire buffer set goes to the STOPPED state.

2) LCW DET, Start=0 624. An LCW with the start bit off was detected. If the message area is in the IDLE state, a previous frame with the start bit on was probably damaged by bit errors on the link, a Damaged MCB/MRB or Data (DM or DD) error is detected, and the message area goes to the ERROR state. If the message area is in the ACTIVE state, it goes to the BUSY state waiting to receive payload bytes. If the message area is in the LOCKED state, a Lock Error is detected and the entire buffer set goes to the STOPPED state. If the message area is in the ERROR state, it stays in the ERROR state.

3) PAYLOAD DET 626. A payload byte was detected. A frame length error is detected if more bytes are received than allowed, and the message area goes to the ERROR state.

4) EOF DET 628. An EOF (end of frame with good CRC) was detected. If the count is satisfied, the message area goes to the LOCKED state. If the count is not satisfied, the message area goes to the ACTIVE state. A frame length error is detected if fewer bytes are received than allowed, and the message area goes to the ERROR state.

5) CV/CRC 630. A Code Violation, CRC error, or link failure condition was detected in the frame payload. The message area goes to the ERROR state.

6) UNLOCK COMMAND 632. A message area unlock command has been received from a processor.

7) LOCK COMMAND 634. A message area lock command has been received from a processor.

Notes from FIG. 6:

1) The STOPPED state for the affected buffer set is entered, and a Protocol Error is recognized.

2) The STOPPED state for the affected buffer set is entered, and a Lock Error is recognized.

3) Most likely, the LCW for a previous frame with the start bit on was damaged by bit errors on the link. A Damaged MCB/MRB or Data (DM or DD) error recognized.

4) When the byte count has not been exceeded, the message area stays in the BUSY state. When the byte count is exceeded, the most likely cause is bit errors on the link, the message area goes to the ERROR state, and a frame length error is recognized.

5) When the byte count is satisfied, the message area goes to the LOCKED state. When the byte count has not yet been satisfied and the frame ends on an appropriate boundary, the message area goes to the ACTIVE state. When the byte count does not end on an appropriate boundary, the most likely cause is bit errors on the link, the message area goes to the ERROR state, and a frame length error is recognized.

Figure 7:
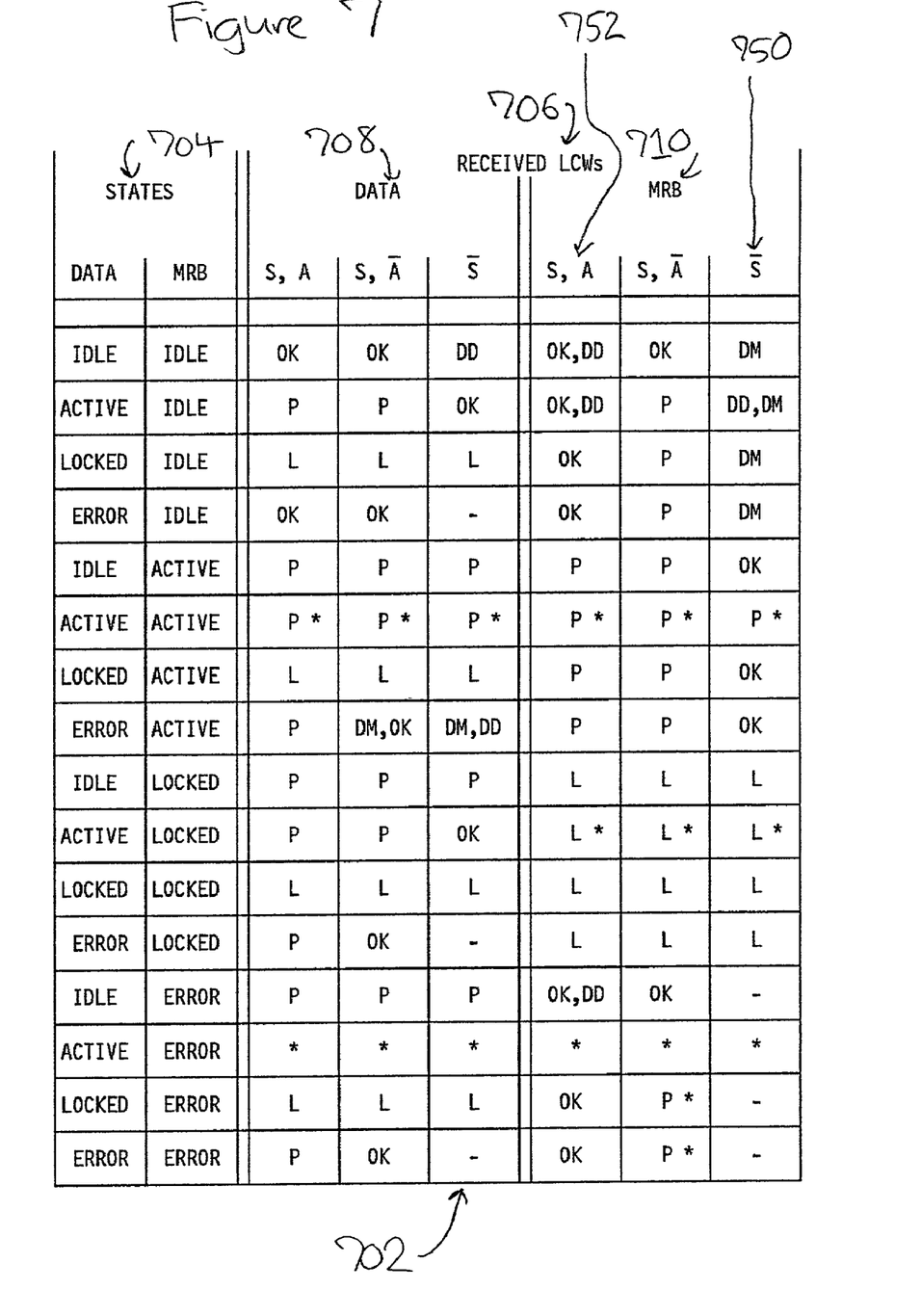
FIG. 7 illustrates the combined state table for the Data and MRB message areas of a single message exchange.
Figure 8:
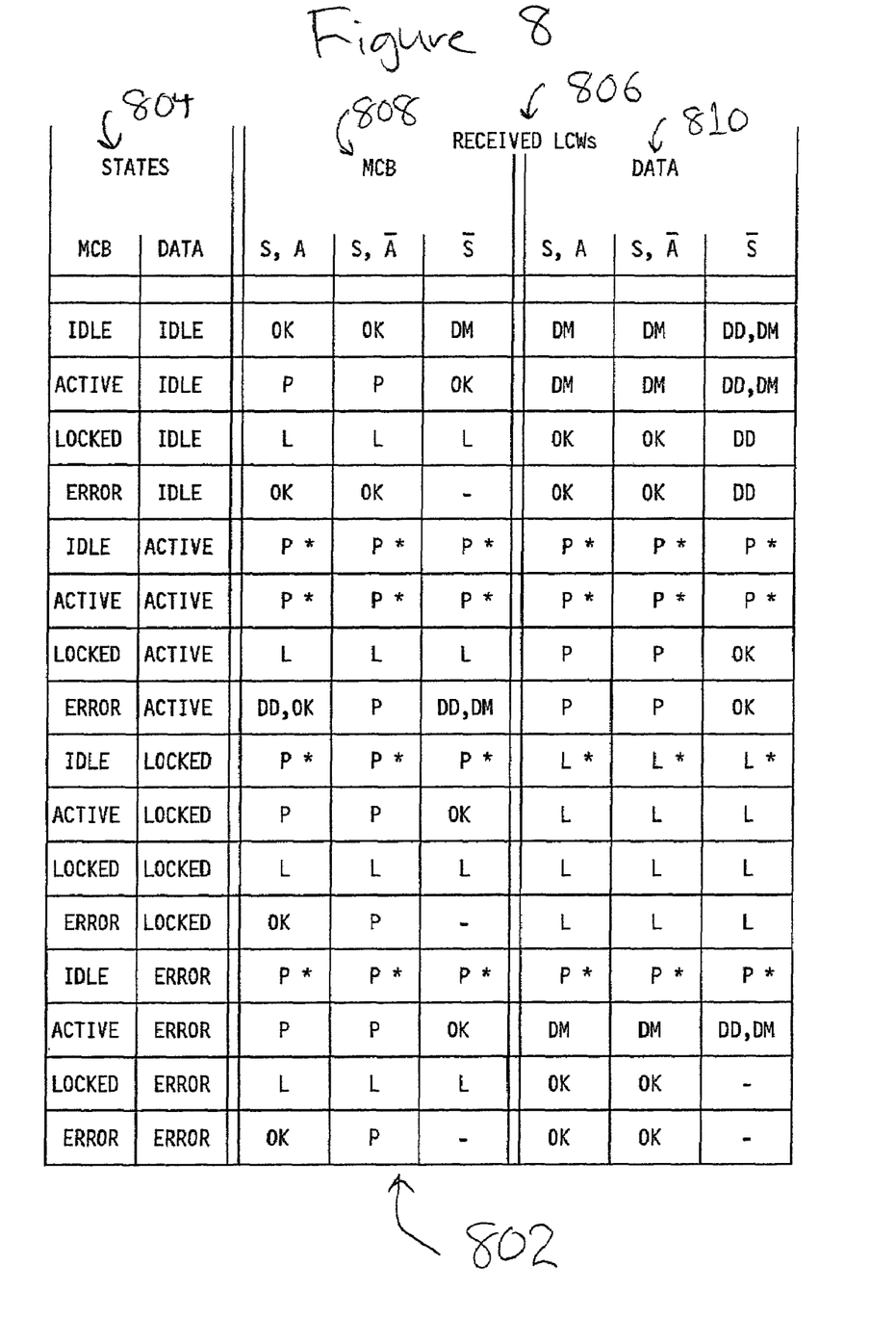
FIG. 8 illustrates the combined state table for the MCB and Data message areas of a single message exchange.
Figure 9:
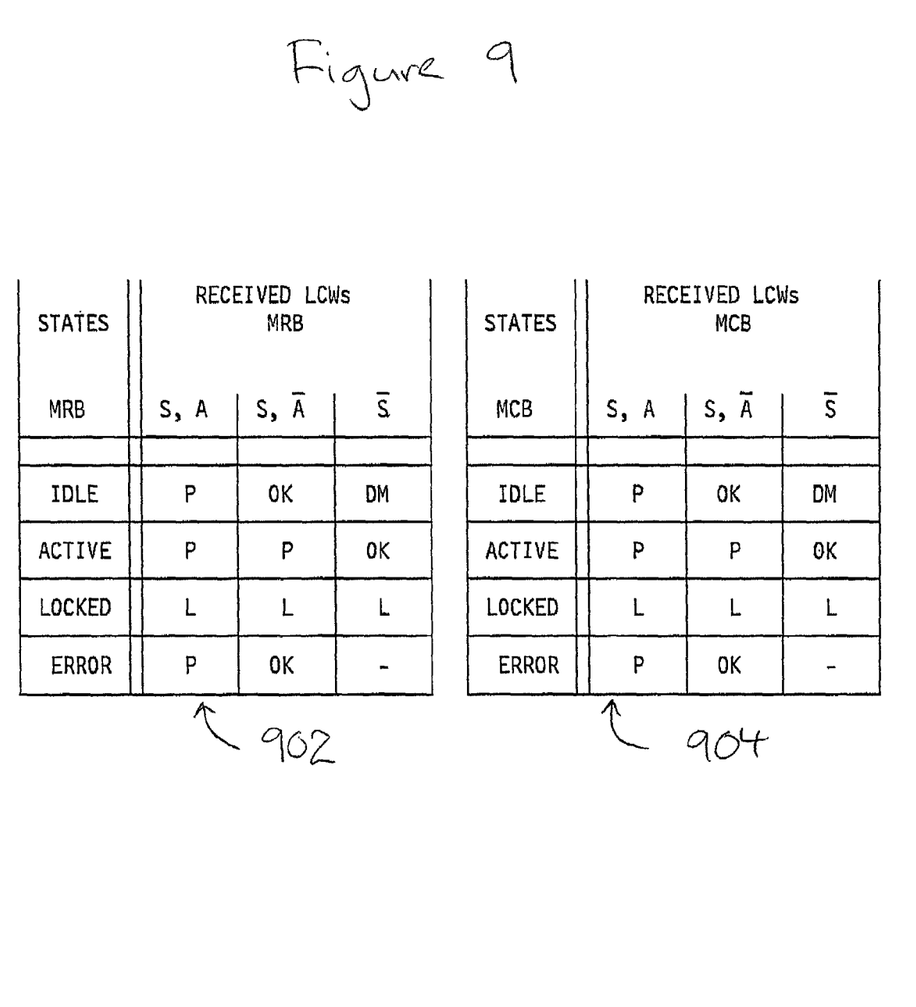
FIG. 9 illustrates the combined state table for Secondary messages containing no Data areas.

FIGS. 7, 8, and 9 are the combined state tables for all message areas for each buffer set. For primary messages (those with optional Data), FIGS. 7 and 8 define how the two message areas work together. It further defines more of the error indicators.

FIG. 7 shows the combined state table 702 for originator primary buffer sets. The events are the LCWs received 706 and are shown along the top of the table. The term DATA 708 indicates LCWs received for Data message areas, and the term MRB 710 indicates LCWs received for MRB message areas. The S bits refer to the LCW start bits, and the A bits refer to the LCW additional data bit.

FIG. 8 shows the combined state table 802 for recipient primary buffer sets. The events are the LCWs received 806 and are shown along the top of the table. The term MCB 808 indicates LCWs received for MCB message areas, and the term DATA 810 indicates LCWs received for Data message areas. The S bits refer to the LCW start bits, and the A bits refer to the LCW additional data bit.

The combined states 704, 804 are all 16 combinations of the four states of each of the two message areas. For example, in FIG. 7 when the MRB message area is in the IDLE state, the Data message area can be in either the IDLE, ACTIVE, LOCKED, or ERROR state. The states shown in FIG. 9 are not combined since secondary buffer sets do not have Data message areas.

The tables in FIGS. 7, 8, and 9 have the following definitions:

1) The LOCKED state is the logical or of the buffer set lock bit (BS LOCK) and the message area lock bit (LOCKED).

2) The received LCW S bit is the Start bit.

3) The received LCW A bit is the Additional Data bit in all cases except in MRBs when the MRB message area is in the ERROR state.

4) When the MRB message area is in the Error state, the MRB A bit is NOT from the received LCW, but is remembered from the previously received good MRB LCW with the start bit set to one.

5) For originator primary buffer sets, if the LCW of the first MRB frame is lost (setting the DM bit), the state of the A bit cannot be determined. In these cases the MRB message area is put into the error state, and the entire buffer set is put into the stopped state. Even though the A bit is known in the originator primary case when the MRB message area is in the active state and the data message area is in the Error state, the entire buffer set is still put into the stopped state.

6) When two entries are shown, the first refers to the MCB/MRB message area and the second refers to the data message area.

7) Once transmission of a message area for a particular buffer set has started, it must finish (or ended early in the link Reject case) before transmission of the other message area of the same buffer set can start.

When operating with prior art ISCs, all MCBs and MRBs are limited to 256 bytes and must therefore be transmitted in a single frame. Consequently, the S (Start) bit must always be on. Also, the A bit is valid in primary MRBs only when the frame is initially transmitted and it is not valid when retransmitted as the result of a link Reject.

When MCBs and MRBs are allowed to be up to 1024 bytes, and they may be split into as many as four segments. The S (start) bit is used in the same way as in data frames when MCBs and MRBs are segmented. In addition, the validity of the A bit in primary MRBs is extended to all MRBs (initial or retransmitted) when the S bit is on.

In FIGS. 7, 8, and 9, the abbreviations have the following meanings:
OK OK to Receive Frame
L Lock Error
P Protocol Error
DM Damaged MRB or MCB Possible
DD Damaged DATA Possible
- No Action
* State Cannot Occur There are a few other errors detected by these hardware state machines not shown in the figures:

1) Protocol. The hardware state machines detect when an originator primary buffer set receives data area frames during a write operation.

2) Protocol. The hardware state machines detect when a recipient primary buffer set receives data area frames during a read operation.

As an example showing the use of FIG. 7, an originator primary buffer set is performing a read operation and both the DATA and the MCB message areas are in the IDLE state. Assume that both the Data frame(s) and the first of multiple MRB frames were lost. Then, the first frame received without error is the MRB with the start bit off (column 750), and the hardware sets the error event and informs a processor of the LCW of the frame and the DM (Damaged MRB Possible) error indicator. The code running on the processor determines that the beginning of the MRB must have been lost, but it doesn't yet know if data frames were to precede the MRB. The code then issues a reject (request for resend) for the MRB frame(s) to the other side of the link.

When the retransmitted MRB is received, the Data area is in the IDLE state and the MRB is in the ERROR state. In column 752, the hardware recognizes the LCW with the start bit on and the A bit on. Since the Data message area is not in the LOCKED state, the hardware sets the DD (Damaged Data Possible) bit and informs a processor. The code issues a reject (request for resend) for the Data area frame(s).

FIG. 9 shows the state tables for secondary buffer sets. Secondary Buffer Sets have only one receive message area. Table 902 is for originator secondary buffer sets and table 904 is for recipient secondary buffer sets.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for sending messages between computer systems, comprising the steps of:
   automatically in hardware state machines located in each communicating computer system keeping track of frame reception for different kinds of multiple message sequences in a message passing channel from an originator to a recipient computer system when multiple messages are transmitted in one or multiple frames over a link, wherein
   said multiple messages each have one or more frames for an originator which contains a command for the recipient, one or more frames which have data or no data; and a linked message process includes the exchange of an intermediate Link Acknowledge (ACK) acknowledgment frame; and
   said recipient responds with a response back to an originator with one or more frames in one of said multiple messages from the recipient to the originator, including a response, and one or more frames with data or no data contained in the response.

2. The method according to claim 1 wherein for a no data case the originator sends a Message Command Block CMCB) to the recipient, and the recipient responds with a Message Response Block (MRB) sent back to the originator, and wherein both a request and response have multiple and interleaved frames.

3. The method according to claim 2 wherein for a write case the originator sends data to the recipient as part of a message containing said Message Command Block (MOB) to the recipient, and following the MOB, the originator sends a first data message area frame to the recipient.

4. The method according to claim 2 wherein for a write if data area message buffer space is limited at the recipient, not all of the message data can be sent in one data area frame message, and flow control is realized through a Link Acknowledge (ACK) sent by the recipient back to the originator when buffer space becomes available, affording the originator the opportunity to respond by sending a next data area frame message to the recipient, and wherein said Link Acknowledge can be repeated many times depending on the number of data areas transferred until a last Data area is received, whereupon the recipient sends a Message Response Block (MRB) sent back to the originator.

5. The method according to claim 2 wherein for a read case where the originator receives data from the recipient, and following a Message Command Block (MOB) the recipient sends the first Data area back to the originator.

6. The method according to claim 5 wherein for a read if data area message buffer space is limited at the originator, not all of the message data can be sent in one data area frame message, and flow control is realized through a Link Acknowledge (ACK) sent by the originator back to the recipient when buffer space becomes available, affording the recipient the opportunity to respond by sending a next data area frame message to the originator, and wherein said Link Acknowledge can be repeated many times depending on the number of data areas transferred until a last Data area is received, whereupon the recipient sends a Message Response Block (MRB) sent back to the originator.

7. The method according to claim 6 wherein the format of the frames used to exchange messages includes MeBs, Data, MRDs, and ACKs over the link, and wherein each frame starts with a Link Control Word (LCW) followed by a first Cyclic Redundancy Code (CRC) protecting the LCW.

8. The method according to claim 6 wherein the format of the frames used to exchange messages includes MCBs, Data, MRBS, and ACKs over the link, and wherein each Data frame includes a payload which consists of anywhere from zero to 4096 bytes, and if there is a payload with greater than zero bytes, it is protected by a second Cyclic Redundancy Code .

9. The method as recited in claim 1, wherein keeping track includes:
   keeping state information for the command, data, and response portions of the message;
   analyzing combinations of said states to determine their validity; and
   recognizing error conditions.

10. The method as recited in claim 1, wherein the hardware state machine can recognize potential lost frames.

11. The method as recited in claim 1, wherein the hardware state machines alert a processor when errors are detected.

12. The method as recited in claim 1, wherein the hardware state machines receive extended length commands and responses.

13. The method as recited in claim 1, wherein the hardware state machines process errors, including potential lost frames in extended length commands and responses.

14. The method as recited in claim 1, wherein the hardware state machines process the additional data indicators in both the prior end new modes.

* * * * *